United States Patent
Gallet (12)

(10) Patent No.: US 6,269,932 B1
(45) Date of Patent: Aug. 7, 2001

(54) AUTOMATIC DEVICE ALLOWING FOR A HIGH OUTPUT IN THE DISCHARGING OF OBJECTS FROM A VIBRATING TABLE TO AN ON-LINE CONVEYOR

(75) Inventor: Patrick Gallet, Mennecy (FR)

(73) Assignee: Societe d'Utilisation Scientiftique et Industrielle du Froid Usifroid, Maurepas (FR)

( * ) Notice: Subject to any disclaimer, the term of this patent is extended or adjusted under 35 U.S.C. 154(b) by 0 days.

(21) Appl. No.: 09/438,505

(22) Filed: Nov. 12, 1999

(30) Foreign Application Priority Data

Nov. 19, 1998 (FR) .................................................. 98 14542

(51) Int. Cl.⁷ .................................................. B65G 25/00
(52) U.S. Cl. .......................................... 198/430; 198/740
(58) Field of Search .................................... 198/429, 430, 198/426, 740, 736, 738, 742

(56) References Cited

U.S. PATENT DOCUMENTS

| | | | |
|---|---|---|---|
| 5,044,488 | * | 9/1991 | Bolin ..................................... 198/430 |
| 5,092,449 | | 3/1992 | Bolin et al. . |

FOREIGN PATENT DOCUMENTS

| | | |
|---|---|---|
| 554 793 | 10/1974 | (CH) . |
| 0 429 348 | 5/1991 | (EP) . |
| 1 390 162 | 6/1965 | (FR) . |
| 2 528 958 | 12/1983 | (FR) . |

* cited by examiner

Primary Examiner—Kenneth W. Noland
(74) Attorney, Agent, or Firm—Arent Fox Kintner Plotkin & Kahn, PLLC

(57) ABSTRACT

The present invention provides an automatic device for discharging, from a vibrating table to an on-line conveyor, continuously arriving flat-bottomed objects, which device operates in cycles and each of the cycles of which includes the following stages: said objects are accommodated in a ditch contiguous with the forward edge of said vibrating table (1) so as to form a row; said row of objects is pushed by a pusher (11), the initial speed of which is zero, towards a smooth surface (12) extending in a transverse direction in relation to the vibrating table (1) in the continuation of the ditch (4); said objects arrive on a conveyor belt (13) located in the continuation of the smooth surface (12); and, while the pusher (11) discharges said row and then returns to its initial position, a fresh row of objects gradually forms in the ditch (4).

3 Claims, 2 Drawing Sheets

Figure 1:
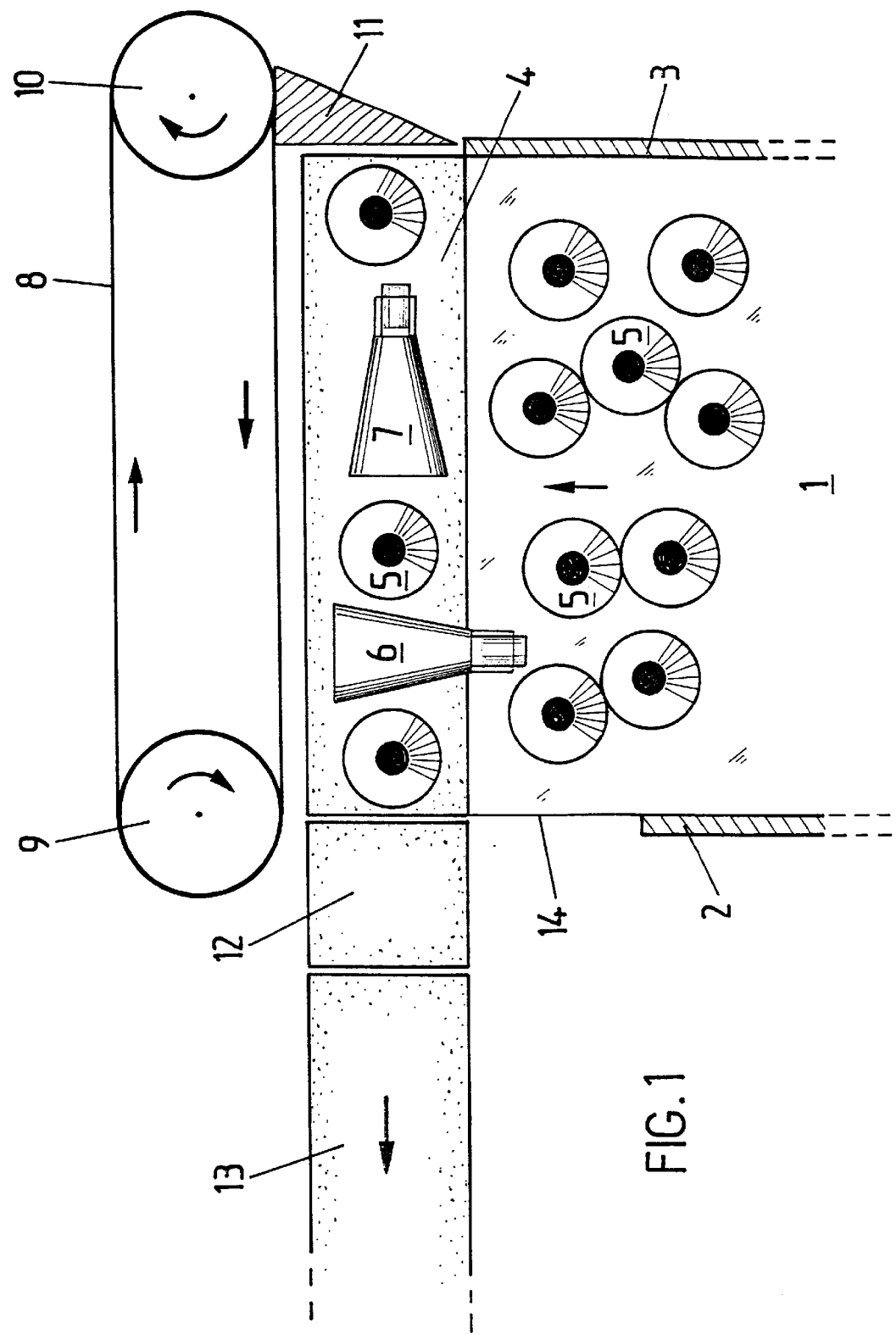

AUTOMATIC DEVICE ALLOWING FOR A HIGH OUTPUT IN THE DISCHARGING OF OBJECTS FROM A VIBRATING TABLE TO AN ON-LINE CONVEYOR

The present invention relates to an automatic device allowing for a high output in the discharging, from a vibrating table and to an on-line conveyor, of continuously arriving flat-bottomed objects. Such objects can, for example, be flasks or cans that have just been filled or have just undergone an industrial treatment, and which are going to be supplied to an automatic crimper.

Such a device is suited, among other things, to the discharge of flasks, or bottles, from lyophilization, or freeze drying, vessels. It will be noted, in this connection, that freeze drying vessels are designed to process certain substances, in particular biological materials, most often contained in bottles the base of which is a circle having a small cross-section. Among the essential constraints associated with this field of the art should be noted, in the first place, the very strict hygiene requirements (aseptic packaging and contamination prevention measures) the observance of which preferably entails the use of a system free from human intervention. That is why automatic routing devices are preferable to manual devices.

In addition, it is important to be able to load the vessels with, and unload therefrom, the greatest possible number of bottles in the shortest possible time, not only for the usual reasons of profitability associated with continuous product flow, but also because, during such loading and unloading operations, the vessels are open to the outside atmosphere (this communication is an unfortunate constraint since, in addition to the aforementioned hygiene requirements, the freeze drying process demands a very low level of humidity in the vessels).

The successive steps of routing the bottles entering the freeze drying vessels and exiting therefrom after treatment, up to the time of depositing said bottles on a vibrating table, have, moreover, been the subject of two patent applications in the name of the present Applicant. The present invention thus relates to the following, and final, stage of this route, at the beginning of which the bottles arrive at the end of their progression over said vibrating table, which serves as a buffer prior to discharge to an on-line conveyor.

As will emerge from a study of the following description, the invention applies to any kind of flat-bottomed object, which may be cylindrical, conical or of other shapes but which, for the sake of convenience, will be designated hereinafter by the general term of "bottles".

In the state of the art, there are already known automatic devices permitting the discharge of such bottles from a vibrating table to an on-line conveyor, the conveyor belt of which commences at a forward corner of said table. In some of these devices, said conveyor belt extends in a direction that is longitudinal in relation to the vibrating table, and there is placed, in the angle formed by the front of the vibrating table and the conveyor belt, a uniformly rotating gear wheel whereof the spaces between the teeth have a shape mating with that of said bottles; said gear wheel thus seizes said bottles in said spaces so as to deposit them a moment latter on the conveyor. In other conventional devices, the conveyor belt extends transversely in relation to the vibrating table, and the bottles are driven by a straight serrated edge performing an alternating motion along the forward edge of said table.

These known devices have to allow the bottles the time to be sufficiently inserted into said tooth spaces to be able to ensure their transport without the bottles prematurely leaving the spaces. As a result, the known devices permit only a low output, which is quite inadequate in relation to the rate of several hundreds per minute at least that is desirable here for the reasons given above.

To allow for a reliable discharge even at high output, the present invention provides an automatic device for discharging, from a vibrating table to an on-line conveyor, continuously arriving flat-bottomed objects, which device operates in cycles and each of the cycles of which includes the following stages:

said objects are accommodated in a ditch contiguous with the forward edge of said vibrating table so as to form a row;

said row of objects is pushed by a pusher, the initial speed of which is zero, towards a smooth surface extending in a transverse direction in relation to the vibrating table in the continuation of said ditch;

said objects arrive on a conveyor belt located in the continuation of said smooth surface; and while the pusher discharges said row and then returns to its initial position, a fresh row of objects gradually forms in the ditch.

According to one additional feature of the invention, a cut-out portion is formed on the forward edge of a guard rail which runs along the lateral edge of said vibrating table and is located on the same side of the vibrating table as said smooth surface, in order to cause any object which, after dropping into said ditch, has overturned in such a way that one part of said object rests on the vibrating table, to fall when it reaches said edge of the vibrating table.

According to another additional feature of the invention, said pusher is fixed to an endless belt that winds under tension around two drive wheels.

Figure 2:
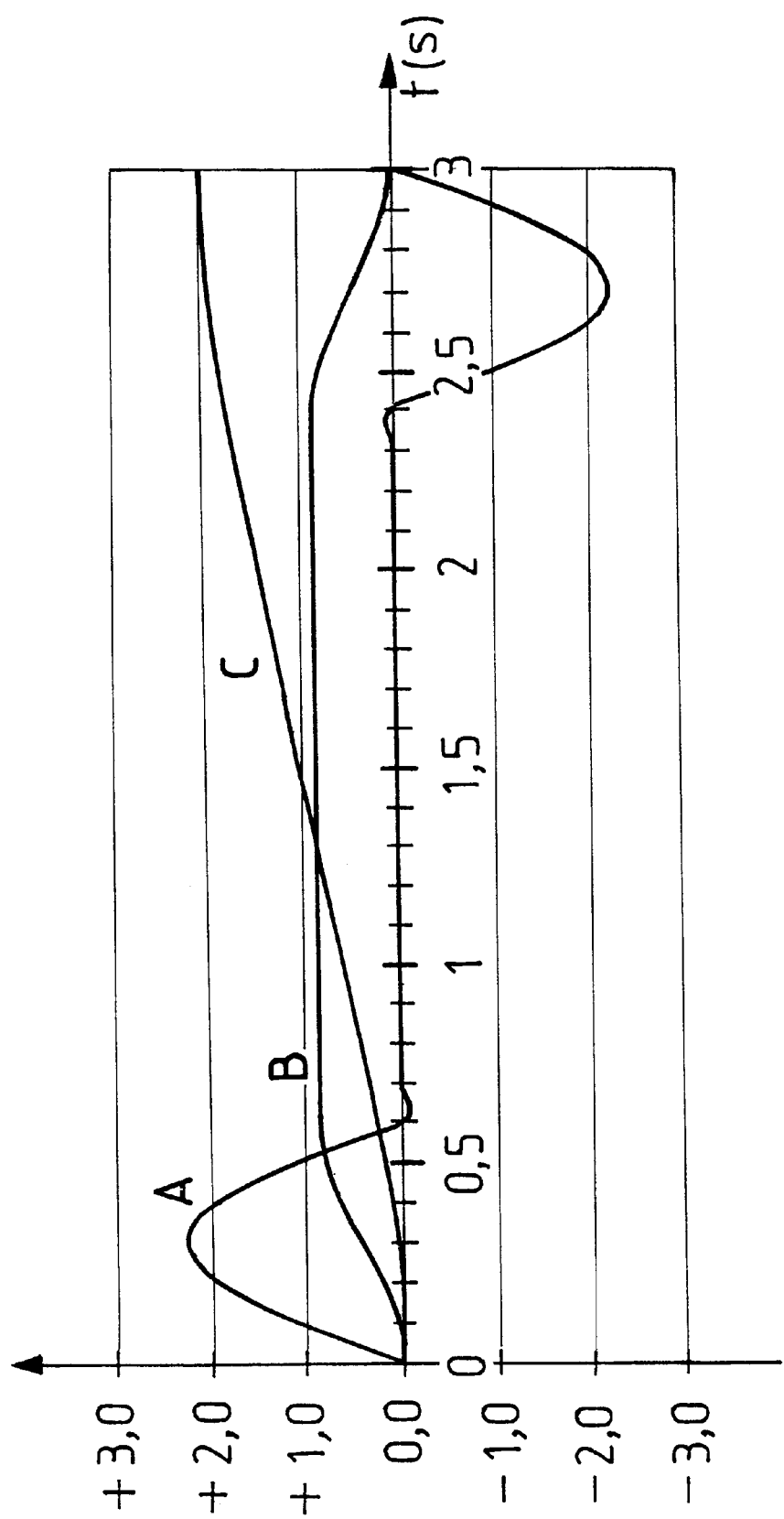

Further advantages, objects and features of the present invention will emerge from the description given below of a form of embodiment of the invention presented by way of example, said description being given with reference to the annexed figures, wherein:

FIG. 1 is a top view of a device according to the invention, at the time when the discharge of a row of bottles is about to begin; and FIG. 2 is a graph illustrating the linear properties of the movement of said pusher in time, with curve A representing the acceleration of the pusher, curve B its speed and curve C its displacement.

FIG. 1 shows a number of bottles approaching the forward end of a vibrating table 1, which they have gone through in the longitudinal direction indicated by the arrow. Vibrating table 1 is bordered on its laterally opposite sides by longitudinal guard rails 2, 3.

A ditch 4 extends in such a way as to be contiguous with the forward edge of vibrating table 1, slightly below. The width of said ditch 4 is somewhat larger than that of the bottles, so that the latter can easily fit therein while remaining upright after dropping into it, as, for example, in the case of bottle 5. It may happen (not usually very often) that one of the bottles overturns, either in such a way that it lies inside ditch 4, as, for example, in the case of bottle 7, or crosswise in such a way that part of the bottle rests on vibrating table 1, as, for example, in the case of bottle 6; the special cases of these overturned bottles will be discussed at the end of the present description.

An endless belt 8, which winds under tension about two drive wheels 9, 10 with vertical axes, travels along the forward edge of ditch 4, in the direction indicated by the arrows. This endless belt 8 serves to transport a pusher 11, fixed thereto, along a closed circuit travelled over periodically in a movement the linear properties as a function of time of which are set forth in Table 1. The numeric values contained in said Table 1 (which are provided solely by way of an example intended to assist in understanding the invention) are shown in the graph of FIG. 2. The initial time (t=0) is taken as the moment when pusher 11 is placed along the lateral edge of ditch 4 which is located in the continuation of guard rail 3.

Along the opposite lateral edge of ditch 4, that is to say the edge located in the continuation of guard rail 2, is disposed a smooth surface 12, having a length equal to 18 mm and a width at least equal to that of ditch 4, of which said smooth surface 12 is thus a continuation in the transverse direction in relation to vibrating table 1. The conveyor, finally, extends in the same direction and in the continuation of said smooth surface 12. The direction of the uniform movement of conveyor belt 13 of the conveyor, the speed of which is equal to 22 cm/s, is indicated by an arrow in FIG. 1.

The operation of the device according to the invention will now be described with reference to the numeric data contained in Table 1, wherein the distance measurements relate to the displacement of pusher 11, firstly along the forward edge of vibrating table 1, which measures 600 mm, and then along the path that passes round drive wheels 9 and 10 and returns pusher 11 to its initial position.

As to the occasional bottles, such as bottle 6, that slide or roll over vibrating table 1 while the row of bottles of which they form part is being discharged, arrangements are made to cause them to drop into a recipient provided for this purpose at the moment they reach smooth surface 12: this result is obtained simply by means of a cut-out portion 14 formed on the forward end of guard rail 2. Said cut-out portion also ensures that such a bottle does not hit the forward end of guard rail 2, which would have the disastrous result of impeding the advance of the row of which it is a part.

Thanks to these arrangements, the system according to the invention makes it possible, automatically and completely reliably, even at high output, to discharge all types of flat bottomed objects, whether fragile or otherwise, from a vibrating table to route them over a conveyor to their final destination.

TABLE 1

| Time (s) | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| Acceleration (m/s$^2$) | 0.0 | 1.1 | 1.9 | 2.2 | 2.0 | 1.1 | 0.0 | 0.0 | 0.0 | 0.0 | 0.0 |
| Speed (m/s) | 0.010 | 0.066 | 0.220 | 0.430 | 0.640 | 0.794 | 0.851 | 0.851 | 0.851 | 0.851 | 0.851 |
| Position (m) | 0.000 | 0.004 | 0.018 | 0.051 | 0.104 | 0.176 | 0.258 | 0.343 | 0.428 | 0.513 | 0.598 |
| Time (s) | 1.1 | 1.2 | 1.3 | 1.4 | 1.5 | 1.6 | 1.7 | 1.8 | 1.9 | 2.0 | 2.1 |
| Acceleration (m/s$^2$) | 0.0 | 0.0 | 0.0 | 0.0 | 0.0 | 0.0 | 0.0 | 0.0 | 0.0 | 0.0 | 0.0 |
| Speed (m/s) | 0.851 | 0.851 | 0.851 | 0.851 | 0.851 | 0.851 | 0.851 | 0.851 | 0.851 | 0.851 | 0.851 |
| Position (m) | 0.683 | 0.769 | 0.854 | 0.939 | 1.024 | 1.109 | 1.194 | 1.279 | 1.364 | 1.449 | 1.534 |

The speed of pusher 11 is initially zero. It then begins to push the bottles towards smooth surface 12 in a movement that completely sweeps ditch 4. The speed of pusher 11 stabilizes at approximately 85 cm/s after 0.6 s. This gradual acceleration of the row of bottles, pushed as it is by pusher 11, ensures that said bottles will not be damaged despite the small intervals initially separating them.

Pusher 11 finishes pushing the row of bottles, that is to say reaches said distance of 600 mm, at t=1,0 s. At time zero, the leading bottle enters, at zero speed, smooth surface 12, over which it begins to slide while accelerating. When said leading bottle reaches the opposite side of said smooth surface 12, at t=0.2 s, its speed is equal to 22 cm/s, which is precisely that of conveyor belt 13: said bottle thus arrives on conveyor belt 13 perfectly smoothly. The following bottles accelerate over a greater distance before arriving on conveyor belt 13 and, as a result, their speed is greater than that of conveyor belt 13; fortunately, this does not cause any problem as the absorbent coating of conveyor belt 13 soon slows down said bottles smoothly, according to the usual practices of conveyor techniques.

While pusher 11 travels over its return path, a fresh row of bottles fills ditch 4. At t=2.5 s approximately, pusher 11 begins to slow down and it is once more, at t=3.0 s, in its initial position at the edge of ditch 4; a new discharge cycle then begins.

Control of the motors actuating drive wheels 9 and 10 is clearly designed to produce the desired kinematics, described above, for pusher 11 throughout each discharge cycle.

The case of the occasional bottles, such as bottle 7, lying in the direction of conveyor belt 13, is handled in the known manner, simply by providing a winding portion in the path taken by conveyor belt 13 before arriving at the automatic crimper: at this winding portion, said overturned bottles drop from the conveyor into a recipient provided for this purpose.

What is claimed is:

1. Automatic device for discharging, from a vibrating table to an on-line conveyor, continuously arriving flat-bottomed objects, characterized in that it operates in cycles, with each of the cycles including the following stages:

said objects are accommodated in a ditch (4) contiguous with the forward edge of said vibrating table (1) so as to form a row;

said row of objects is pushed by a pusher (11), the initial speed of which is zero, towards a smooth surface (12) extending in a transverse direction in relation to the vibrating table (1) in the continuation of the ditch (4);

said objects arrive on a conveyor belt (13) located in the continuation of the smooth surface (12); and while the pusher (11) discharges said row and then returns to its initial position, a fresh row of objects gradually forms in the ditch (4).

2. Device according to claim 1, characterized in that a cut-out portion (14) has been formed on the forward edge of a guard rail (2) which runs along the lateral edge of said vibrating table (1) and is located on the same side of the vibrating table (1) as said smooth surface (12), in order to cause any object (6) which, after dropping into said ditch (4), has overturned in such a way that one part of said object (6) rests on the vibrating table (1), to fall when it reaches said edge of the vibrating table (1).

3. Device according to claim 1 or claim 2, characterized in that said pusher (11) is fixed to an endless belt (8) that winds under tension around two drive wheels (9) and (10).

* * * * *